Sept. 25, 1962 F. SAMET 3,055,635
ROTOR SPEED CONTROL APPARATUS
Filed Oct. 18, 1960
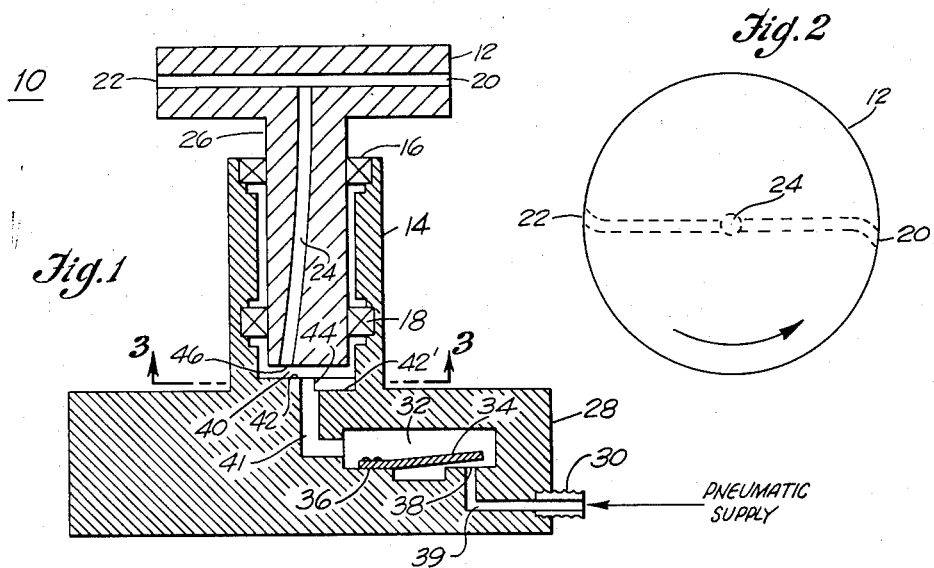
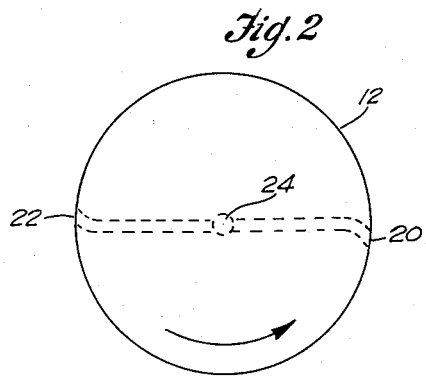
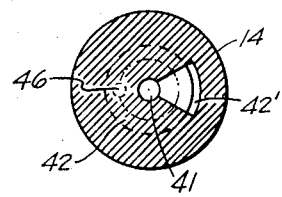
FRANK SAMET
INVENTOR.
BY Andrew L. Bain
Sal A. Giarratana
ATTORNEYS United States Patent Office 3,055,635
Patented Sept. 25, 1962

3,055,635
ROTOR SPEED CONTROL APPARATUS
Frank Samet, New York, N.Y., assignor to General Precision Inc., Little Falls, N.J., a corporation of Delaware
Filed Oct. 18, 1960, Ser. No. 63,351
2 Claims. (Cl. 253—82)

The present invention relates to a speed control apparatus and more particularly to a speed control apparatus synchronized with controlled frequency oscillators to provide constant angular momentum in a pneumatically driven rotor.

In general, speed control of a pneumatically driven rotor frequently requires elaborate auxiliary equipment like separate speed sensors and flow control valves which results in a device which is not susceptible for use in high precision reference systems. Accordingly, presently used speed control techniques are not adaptable for use in high speed precision systems in which weight and temperature considerations require more sophisticated devices, such as a pneumatically driven rotor and speed control system.

The present invention in its preferred form comprises a pneumatically driven rotor assembly having two pneumatic valves associated therewith. One of the valves has a pulsatory output at a fixed frequency, such as a reed or resonator operated valve, while the other valve has a pulsating output at a variable frequency. The valves are arranged in series in the flow line of the fluid fed into the rotor, so that the rotor speed is stabilized when the variable frequency is equal to the fixed frequency.

An object of the present invention is the provision of an apparatus for maintaining constant speed in a pneumatically driven rotor member by maintaining the flow substantially constant.

Another object is to provide a speed control apparatus synchronized with a number of controlled frequency oscillators to provide constant angular momentum.

Still another object is to provide a speed control apparatus utilizing a fixed frequency oscillator and a variable frequency oscillator in series, wherein rotor speed is stabilized when the variable frequency is equal to the fixed frequency.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIGURE 1 is a cross-sectional view of a preferred embodiment of the invention;

FIGURE 2 is a top view of the rotor member in the apparatus of FIGURE 1; and

FIGURE 3 is a sectional view of the device taken on the line 3—3 of FIGURE 2, looking in the direction of the arrows.

Referring now to the drawing, there is illustrated a preferred embodiment 10 comprising a rotor 12 mounted in a support member or stator 14 and rotatably supported therein by a plurality of bearings 16 and 18. Reaction jets 20 and 22 are integrally provided within the rotor, and are coupled to a flow conduit 24 integrally formed within the rotor hub 26.

The stator 14 is provided with a base structure 28 provided with a conduit fitting 30 connected to a suitable outside pneumatic supply (not shown). A chamber 32 is formed within the base structure, having a suitable configuration to support therein a reed member 34 adapted to vibrate at a fixed frequency.

The reed is fixed at one end 36 to the base structure so that the free end coincides with an orifice 38 operatively coupled to the supply fitting 30 by a conduit 39. The chamber 32 is coupled by a conduit 41 to another chamber 40, formed between the end of the rotor hub 26 and the axially spaced base structure end wall 42. The base structure end wall is formed with a step 44 to provide an axially variable spacing between the end wall 42 and the end of the rotor hub containing an orifice 46 formed at the end of the flow conduit 24. The orifice 46 is radially displaced from the axis of the rotor hub so that the path of the orifice, as shown in FIGURE 3, is over the end wall 42 variably spaced therefrom. A recess portion 42' in the end wall provides the chamber 40 with an expansion portion suitable for producing pressure impulses, as hereinafter discussed.

In the operation of the preferred embodiment 10, fluid, such as a suitable compressed gas, enters the base structure 28 through fitting 30 and conduit 39 to the orifice 38, which is partially obstructed by the reed 34, and into the chamber 32. Thereafter, the gas passes through conduit 41 into the chamber 40 and then through orifice 46 and conduit 24 into the reaction jets 20 and 22. The reaction jets are curved at their ends, as shown in FIGURE 2, so that the tangential component of the exhaust will cause the rotor to rotate in the direction indicated by the arrow.

Specifically, the impact of the incoming gas through the orifice 38 causes the reed 34 to vibrate at its natural frequency. The vibrating motion of the reed causes the constriction at orifice 38 to vary periodically and to modulate the pressure of the gas entering the chamber 32.

At this point, the gas flow from the chamber 32 through the conduit 41 and into the chamber 40 encounters another constriction caused by the closeness of the orifice 46 to the base structure end wall 42.

FIGURE 3 shows the structural configuration of the end wall 42, which is variably displaced from the orifice 46, illustrating the greater displacement of the sector 42' from the orifice so that the orifice is less obstructed at this point. As the orifice 46 moves in a circular path about the rotor axis, it will, once every rotation, open a wider path to the mass flow as it sweeps over the end wall sector 42'. These rapid flow surges will be sensed as a series of impulses by the reed 34. As long as the frequency of these impulses is lower than that of the natural frequency of the reed, the oscillations of the reed will be in phase with the pulsations of the rapid flow surges. Hence, each time orifice 46 opens wider, over end wall sector 42', the reed 34 will move to its furthest position from the orifice 38. In this manner, the flow into the reaction jets 20 and 22 will be relatively unobstructed and the rotor will be accelerated.

However, when the speed of the rotor exceeds the frequency of the reed 34, the motion of the reed will be 180 degrees out of phase with the speed control pulsations caused by the variation of the orifice 46 relative to the variably displaced end wall 42. Hence, the reed 34 will be at its closest position to the orifice 38 when orifice 46 is at the greatest displacement relative to the end wall 42. The mass flow through orifice 38 will be restricted and the rotor decelerated, resulting in the rotor tending to synchronize with the reed 34 at its natural frequency.

Accordingly, when the frequency of rotation of rotor 12 is such that orifice 46 and chamber sector 42' coincide with a frequency corresponding with the natural frequency of occurrence of upwardly directed movement of reed 34 then relatively little obstruction is offered to gas flow and the flow can be regulated so that at such times the rotor will accelerate. On the other hand, when the frequency of rotation of rotor 12 is such that orifice 46 and chamber sector 42' coincide with a frequency corresponding with the natural frequency of occurrence of downwardly directed movement of reed 34 then a relatively greater obstruction is offered to gas flow and the flow can be regulated so that at such time the rotor will decelerate. Thus, with the flow regulated so that when the frequency of impulses within chamber 40 is in phase with the natural frequency of the reed the rotor accelerates and when the frequency of impulses within chamber 40 is out of phase with the natural frequency of the reed the rotor decelerates. The rotor will tend to synchronize with the natural frequency of the reed, a slight decline in the frequency of impulses within chamber 40 below the natural frequency of the reed causing an acceleration in speed and a slight increase in the frequency of impulses within chamber 40 above the natural frequency of the reed causing a deceleration in speed.

In summary, the incoming flow through the fitting 30, and orifice 38, excites a reed 34 to vibrate at its natural frequency and in doing so, it changes periodically the constriction of the orifice and thereby varies the gas flow at the same imposed frequency. The other speed control valve works in such a manner that as the orifice 46 rotates about the rotor axis, the flow is more or less restricted due to the variation in the relative spacing between the end wall portions 42 and 42" from the orifice. The frequency of these oscillations is equal to the number of rotations per second, or to its multiple, of the rotor.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:
1. A synchronous speed control apparatus comprising:
a stator;
a rotor mounted for rotation within said stator;
reaction jets provided radially on said rotor;
a chamber between said rotor and said stator;
conduit means connecting said reaction jets to said chamber;
an orifice at the end of said conduit means radially displaced from the rotor axis;
an end wall to said chamber variably spaced from said orifice, so that rotation of said rotor turning said orifice with respect to said end wall produces flow surges within said chamber;
oscillating means having a fixed frequency mounted within said stator;
conduit means coupling said chamber and said oscillating means; and,
pneumatic supply means operatively coupled to said oscillating means to vibrate said oscillating means so that the vibrations of said oscillating means will cause a pulsating pneumatic flow into said chamber;
whereby, as long as the frequency of the impulses within said chamber is slightly lower than that of the natural frequency of said reed, the oscillation of said reed will be in phase with the impulses and the flow into said reaction jets from said chamber will be relatively unobstructed and accelerate said rotor but when the frequency of the impulses is slightly higher than the natural frequency of said reed, a relatively greater obstruction is offered by the reed to the flow into said reaction jets and the rotor will decelerate.

2. A device as claimed in claim 1, said oscillating means being a reed mounted within said stator.

References Cited in the file of this patent
UNITED STATES PATENTS

| | | |
|---|---|---|
| 1,346,521 | Young | July 13, 1920 |
| 1,624,093 | Davis | Apr. 12, 1927 |
| 2,249,914 | Reichel | July 22, 1941 |